United States Patent [19]
Glance

[11] Patent Number: 4,904,008
[45] Date of Patent: Feb. 27, 1990

[54] MOLDED ONE-PIECE BUMPER

[75] Inventor: Patrick M. Glance, Plymouth, Mich.

[73] Assignee: Concept Analysis Corporation, Plymouth, Mich.

[21] Appl. No.: 902,690

[22] Filed: Sep. 2, 1986

[51] Int. Cl.⁴ .............................................. B62D 35/00
[52] U.S. Cl. ..................................... 293/120; 293/102
[58] Field of Search ............... 293/102, 120, 121, 122, 293/126, 155, 109, 1, 136

[56]  References Cited

U.S. PATENT DOCUMENTS

| | | | |
|---|---|---|---|
| 4,252,355 | 2/1981 | Goupy et al. | 293/120 |
| 4,460,205 | 7/1984 | Glance | 293/120 |
| 4,492,398 | 1/1985 | Peter | 293/120 |
| 4,586,738 | 5/1986 | Butler et al. | 293/107 |
| 4,652,036 | 3/1987 | Okamoto et al. | 293/120 X |

FOREIGN PATENT DOCUMENTS

| | | | |
|---|---|---|---|
| 2258987 | 8/1975 | France | 293/120 |
| 0037338 | 3/1977 | Japan | 293/132 |

Primary Examiner—Russell D. Stomer
Attorney, Agent, or Firm—Waters, Morse & Harrington

[57] ABSTRACT

An automobile bumper is adapted to be molded in one piece from thermoplastic material. The frontal portion is "C"-shaped in cross-section, and has spaced vertical web strips interconnecting the upper and lower rear edges. Certain of these strips have off-sets permitting vertical elongation under impact to control the pattern of deflection of the frontal portion to preserve impact resistance. A die structure having movable core components is provided for producing the bumper.

4 Claims, 2 Drawing Sheets

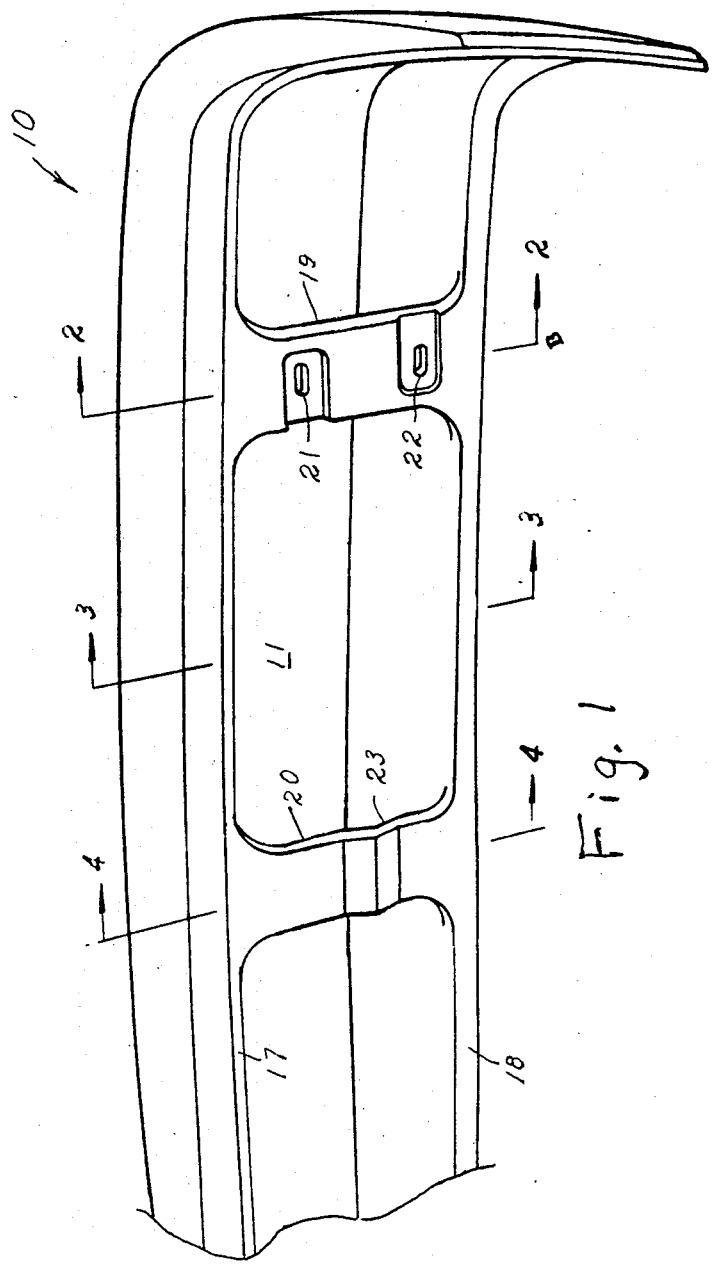
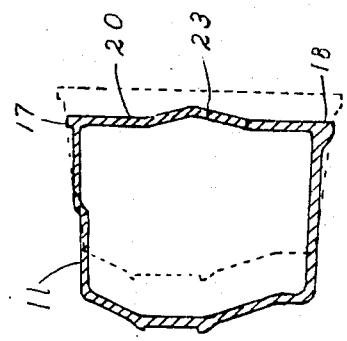
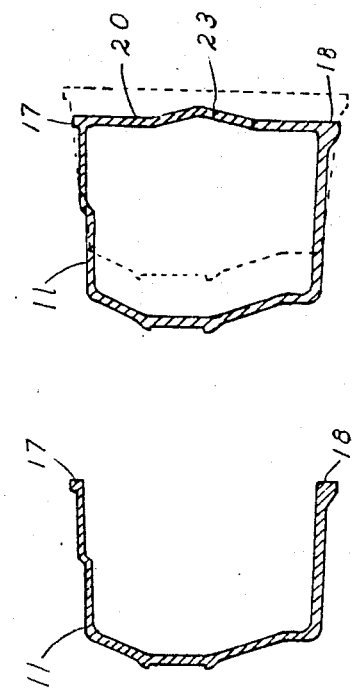
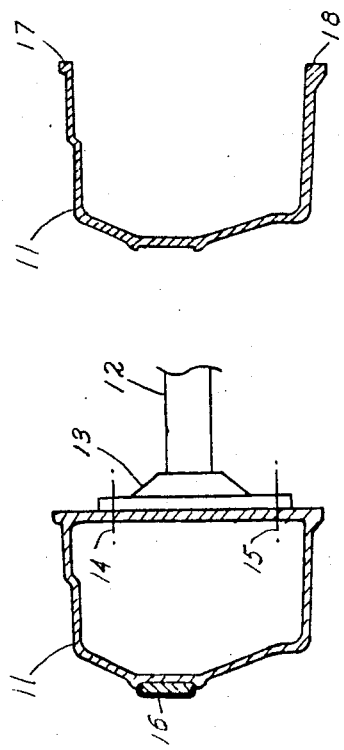

MOLDED ONE-PIECE BUMPER

BACKGROUND OF THE INVENTION

Automobile bumpers have evolved as relatively strong beams mounted on the front (and occasionally at the rear) of vehicles to transfer the forces of impact to the frame structure with a minimum of distortion of the sheet metal components of the body. Occasionally, they are mounted on shock-absorbing struts to dissipate the energy of impact. Except for the earliest vintage automobiles, the beam strength of the bumper results from the generally "C"-shaped frontal section having a relatively high moment of inertia in bending. This bending resistance is largely dependent upon the maintenance of the configuration of the cross-section, as any serious distortion of it is likely to vastly reduce the bending resistance by alteration of the sectional characteristics. For a long period, the bumper was essentially a piece of a steel formed into the desired configuration in a die with a large press. Comparatively recently, there has been a trend toward the manufacture of bumpers from molded thermoplastic materials. The structural shell has frequently been partially or fully closed at the rear to provide a stress-transfer web preventing the frontal "C"-shaped configuration from opening up like a clam shell on impact. These rear webs have been produced either through an extrusion process in which the full periphery of the cross-section extends throughout the length of the bumper, or by molding the bumper in two or more parts, followed by bonding these together through welding or adhesive processes. This type of construction is inherently more expensive, and there is a tendency for the parts to separate along the bonded seams under various conditions.

SUMMARY OF THE INVENTION

The structure of this bumper includes a generally "C"-shaped frontal portion, the upper and lower rear edges being interconnected by spaced vertical web strips. Certain of the these strips are off-set to provide for accordion-type extension under tension to control the pattern of deflection of the frontal portion under impact.

A die system for producing the bumper has "L"-shaped movable core members backed by retractable members in an assembly permitting the web strips to be formed by the "L"-shaped members. These are then laterally withdrawn after retraction of the retractable members, permitting the finished piece to be disengaged from the die sections and the core assembly, with the latter passing out through the spaces on either side of the web strips.

DESCRIPTION OF THE DRAWINGS

FIG. 1 is a perspective view from the rear of an automobile bumper, showing the central and right side.

FIG. 2 is a section on the plane 2—2 of FIG. 1, with the addition of a portion of a shock-absorbing bumper support.

FIG. 3 is a section on the plane 3—3 of FIG. 1.

FIG. 4 is a section on the plane 4—4 of FIG. 1.

DESCRIPTION OF THE PREFERRED EMBODIMENT

Figure 5:
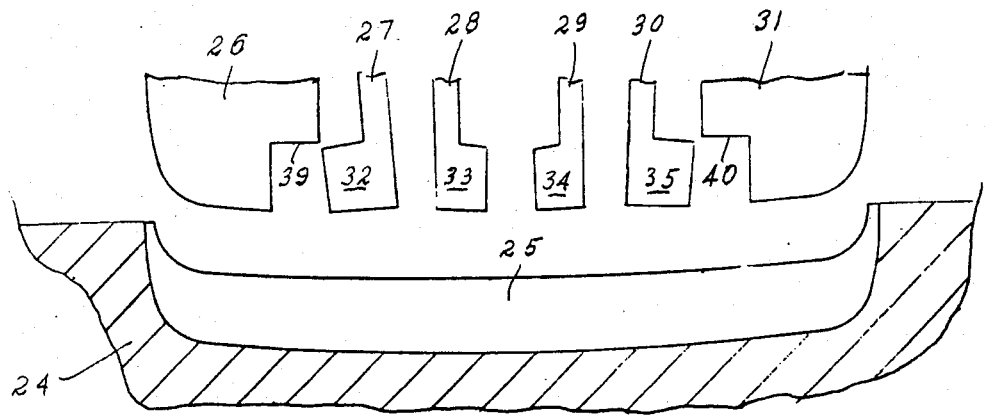
FIGS. 5, 6, and 7 are schematic views showing successive stages in the operation of the die structure and core assembly.

Referring to FIGS. 1–4, the bumper generally indicated at 10 has the "C"-shaped cross-section shown in FIG. 3 throughout most of its lateral length. This configuration may be regarded as the frontal portion 11 of the bumper, and functions as a beam transferring impact forces to shock-absorbing struts 12 mounted on opposite sides of the vehicle, and usually secured to the main frame. Brackets as shown at 13 are normally provided at the ends of the struts for supporting the bumper unit, which is conventionally secured in position with bolts on centerlines as indicated at 14 and 15 in FIG. 2. It is common to provide a composite decorative and abrasion-resistant strip as shown at 16 in the finished bumper, but this forms no part of the present invention.

The upper and lower rear edges 17 and 18 of the frontal portion 11 are interconnected by isolated vertical web strips as shown at 19 and 20 in FIG. 1. The outer strips 19 are adapted for engagement with the brackets 13 of the shock-absorbing struts, with the fastenings traversing the holes shown at 21 and 22. These outer strips are generally planar in configuration, since they inter-engage with the similarly shaped brackets 13. The central web strip 20, however, is provided with an off-set 23 extending slightly to the rear, and which permits a limited amount of accordion-type extension under tension. Without the presence of this strip, the central frontal portion would open up under impact. This alteration of the sectional configuration would severely reduce the ability of the bumper to function as a beam, because of a vastly reduced resistance to bending. As the "C"-shaped configuration opens up and approaches a straight line, the moment of inertia in bending becomes negligible, thus limiting the ability of the bumper to transfer stresses to the shock-absorbing struts 12. The web strip 20 restrains the opening of the frontal portion, and thus maintains the cross-sectional configuration responsible for the impact resistance. The off-set 23 permits a controlled amount of separation of the upper and lower edges 17 and 18, the preferred extent of which is determined by experiment to be appropriate for a bumper of particular dimensions. The dotted lines in FIG. 4 illustrate the deflected condition of the central portion of the bumper and the web strip 20.

Figure 6:
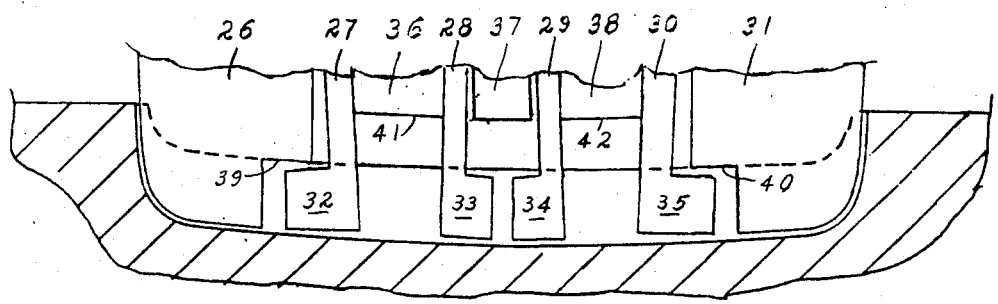
Figure 7:
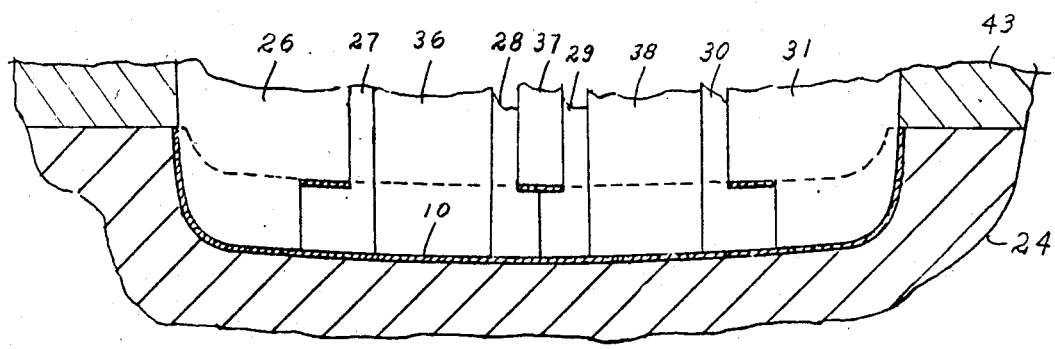

FIGS. 5–7 illustrate successive stages in the operation and configuration of the die system used for molding the bumper illustrated in FIGS. 1–4. A lower die section 24 provides a cavity 25 responsible for forming the front face of the bumper. A system of core components 26–31 is shown in FIG. 5 in the initial, or open, condition of the die assembly. The members 27, 28, 29, and 30 are "L"-shaped in configuration. The innermost of these members 28 and 29 are laterally off-set toward the centerline of the bumper, and the members 27 and 30 are off-set outwardly. The off-set ends of these members are indicated at 32–35, respectively.

When the core assembly is engaged with the lower die section as shown in FIG. 6, the members 36, 37, and 38, which are retractable with respect to the other core components, are moved downward into the position shown in FIG. 7. The effect of this action is to separate the off-set ends 32–33 and 34–35, resulting in the approach of the ends 33 and 34. The ends 32 and 35 are also moved over into engagement with the off-set lower ends of the core members 26 and 31. Space is provided, however, between the off-set ends 32 and 35 and the opposite off-set surfaces 39 and 40 of the members 26 and 31, respectively, to provide for the formation of the outer web strips 19. The lower extremities 41 and 42 move downward to a position where they participate in the formation of the inner surface of the frontal portion of the bumper, as shown in FIG. 7. The remainder of this surface is formed by the lower and side extremities of the members 26 and 31, and by the lower ends of the "L"-shaped members 27, 28, 29, and 30. At some point during or after the final positioning of the core components, the upper die section 43 will close down on the lower die section 24 to form the edges of the bumper. Plastic material is then injected into the space between these members, so that the resulting one-piece bumper is formed as shown. The removal of the finished part, after the thermoplastic material has set, is accomplished by the opening of the die sections, followed by the reverse manipulation of the core components so that the retractable members 36-38 are sufficiently withdrawn to permit lateral movement from the FIG. 7 position to the FIG. 5 position, and thus allow the web strips to escape in the spaces between the off-set ends 32 and 35 and the off-sets in the outer core members 26 and 31, and in the space between the off-set ends 33 and 34. Conventional arrangements for the ejection of the bumper from the lower die section 24 would also normally be provided.

The bumper configuration resulting from this molding system provides a close approach to the performance of a structural beam with a closed section, but with the advantages following from the utilization of thermoplastic material. The deflection control of a closed beam section is substantially maintained, with a considerable reduction in weight as a result of the spaces between the isolated web strips. This weight reduction lowers vehicle overhang mass, and thus improves the ride and steering stability. Dent resistance is improved, and vulnerability of the bumper system is considerably reduced. A wide variety of thermoplastic materials can be used for this sort of injection molding, such as nylon, polycarbonate, polyester, polypropylene, and other polymer materials, both filled and non-filled.

The embodiments of the present invention in which an exclusive property or privilege is claimed are defined as follows:

1. An elongated normally horizontal bumper injection molded in one piece from a moldable plastic material, and having a generally C-shaped frontal shell with upper and lower rear edges and a hollow interior, wherein the improvement comprises:

relatively narrow isolated vertical strips integrally molded in the bumper and interconnecting the upper and lower rear edges of said frontal shell, certain of said strips forming mounting surfaces for attachment to support members, and at least one other of said strips being interposed between said certain strips said other strip having an accordion-like off-set portion that provides for vertical elongation of the other strip under tension as said other strip is pulled toward a straight-line configuration on rearward deflection of said frontal shell.

2. A bumper as defined in claim 1, wherein said other strip is centrally located with respect to the length of said bumper.

3. A bumper as defined in claim 1, wherein said offset extends to the rear of the said frontal shell edges.

4. An elongated normally horizontal bumper injection molded in one piece from a moldable plastic material, and having a generally C-shaped frontal shell with upper and lower rear edges and a hollow interior, wherein the improvement comprises:

relatively narrow isolated vertical strips integrally molded in the bumper and interconnecting the upper and lower rear edges of said frontal shell, certain of said strips forming mounting surfaces for attachment to support members, and at least one other of said strips being interposed between said certain strips, said other strip extending in a non-linear path between the upper and lower rear edges of the frontal shell, such that said other strip can elongate under tension to permit limited vertical separation of the upper and lower rear edges of the frontal shell upon rearward deflection of the frontal shell.

* * * * *